(12) United States Patent
Todd

(10) Patent No.: US 10,152,746 B2
(45) Date of Patent: Dec. 11, 2018

(54) FLEXIBLE SECURITY SYSTEM FOR CASH-IN-TRANSIT

(71) Applicant: Robert Edmund Todd, Cramlington (GB)

(72) Inventor: Robert Edmund Todd, Cramlington (GB)

( * ) Notice: Subject to any disclaimer, the term of this patent is extended or adjusted under 35 U.S.C. 154(b) by 0 days.

(21) Appl. No.: 15/529,674

(22) PCT Filed: Dec. 9, 2015

(86) PCT No.: PCT/GB2015/053772
§ 371 (c)(1),
(2) Date: May 25, 2017

(87) PCT Pub. No.: WO2016/092302
PCT Pub. Date: Jun. 16, 2016

(65) Prior Publication Data
US 2017/0323381 A1 Nov. 9, 2017

(30) Foreign Application Priority Data

Dec. 10, 2014 (GB) .................................. 1421956.2

(51) Int. Cl.
E05B 45/06 (2006.01)
G06Q 40/02 (2012.01)
(Continued)

(52) U.S. Cl.
CPC ......... *G06Q 40/02* (2013.01); *G06Q 10/0832* (2013.01); *G07C 9/00015* (2013.01);
(Continued)

(58) Field of Classification Search
CPC ................................................ G06Q 10/0832
(Continued)

(56) References Cited

U.S. PATENT DOCUMENTS 5,091,713 A * 2/1992 Horne ...................... G07F 5/18
194/204
6,658,091 B1 * 12/2003 Naidoo ............ G08B 13/19669
379/37
(Continued)

FOREIGN PATENT DOCUMENTS

| GB | 2417858 A | 3/2006 |
|---|---|---|
| WO | WO2009052818 A1 | 4/2009 |
| WO | WO2010106552 A2 | 9/2010 |

OTHER PUBLICATIONS

Search Report under Section 17(5) for Great British Patent application No. GB1421956.2 dated Jun. 10, 2015.
(Continued)

*Primary Examiner* — Santiago Garcia

(57) ABSTRACT

There is provided an adaptive access-control and monitor system that comprises at least one portable communication device, further comprising, a transceiver that is adapted to receive and transmit communication signals via a telecommunication link, at least one imaging sensor that is adapted to provide image data to an image processor and a rechargeable energy source and a user interface. The system further comprises at least one first remote actuator that is actuatable by said communication signals and/or electromagnetic energy; at least one control station that is manned by at least one operator and which is adapted to receive and process said image data and monitor and/or control said at least one first remote actuator and said at least one portable communication device via said telecommunication link.

26 Claims, 6 Drawing Sheets

(51) Int. Cl.
  *G07F 19/00* (2006.01)
  *G06Q 10/08* (2012.01)
  *G07C 9/00* (2006.01)
  *G08B 13/196* (2006.01)

(52) U.S. Cl.
  CPC ....... *G07C 9/00309* (2013.01); *G07F 19/207* (2013.01); *G07F 19/208* (2013.01); *G07F 19/209* (2013.01); *G08B 13/1966* (2013.01); *G08B 13/19682* (2013.01); *G07C 2009/00539* (2013.01)

(58) Field of Classification Search
  USPC ....................................................... 340/542
  See application file for complete search history.

(56) References Cited

U.S. PATENT DOCUMENTS

| | | | | |
|---|---|---|---|---|
| 7,689,465 | B1* | 3/2010 | Shakes | G06Q 10/08 705/27.1 |
| 7,959,072 | B1* | 6/2011 | Jenkins | G06Q 20/1085 235/375 |
| 9,387,928 | B1* | 7/2016 | Gentry | B64C 39/024 |
| 9,777,529 | B2* | 10/2017 | McNeill | E05F 15/77 |
| 2004/0203932 | A1* | 10/2004 | Yamagishi | H04M 3/42229 455/457 |
| 2005/0047777 | A1* | 3/2005 | Molldrem, Jr. | G03D 13/00 396/564 |
| 2006/0152594 | A1 | 7/2006 | Landschaft et al. | |
| 2009/0033489 | A1* | 2/2009 | Black | G06Q 20/40145 340/541 |
| 2010/0023162 | A1* | 1/2010 | Gresak | B67D 7/08 700/241 |
| 2010/0268383 | A1* | 10/2010 | Wang | B25J 5/00 700/248 |
| 2011/0046920 | A1 | 2/2011 | Amis | |
| 2012/0007735 | A1 | 1/2012 | Rhyins | |
| 2012/0075059 | A1 | 3/2012 | Fyke et al. | |
| 2012/0242501 | A1* | 9/2012 | Tran | A61B 5/0024 340/870.02 |
| 2013/0008958 | A1* | 1/2013 | Smith | G07C 9/00904 235/382 |
| 2013/0238498 | A1* | 9/2013 | Forsyth | G06Q 20/18 705/43 |
| 2014/0002236 | A1 | 1/2014 | Pineau et al. | |
| 2014/0067668 | A1* | 3/2014 | Bellamy | G07F 19/207 705/43 |
| 2014/0083814 | A1* | 3/2014 | Nomura | G07D 11/0027 194/206 |
| 2014/0305352 | A1* | 10/2014 | Dowling | G07C 9/00031 109/38 |
| 2015/0052253 | A1* | 2/2015 | Johnson | H04L 61/1511 709/226 |
| 2015/0261961 | A1* | 9/2015 | Chen | G06Q 20/4012 705/72 |
| 2016/0078417 | A1* | 3/2016 | DeLuca | G06Q 20/1085 701/23 |
| 2017/0053284 | A1* | 2/2017 | Votaw | G06Q 20/40145 |

OTHER PUBLICATIONS

International Search Report and Written Opinion dated Mar. 23, 2016 for PCT Application, PCT/GB2015/053772 filed Dec. 9, 2015.

\* cited by examiner

FLEXIBLE SECURITY SYSTEM FOR CASH-IN-TRANSIT

The present invention relates generally to the field of theft and robbery prevention systems, and in particular, to the field of security and surveillance systems for protecting valuables, for example, when in transit.

Introduction

It is an unfortunate fact that premises such as ATM (Automated Teller Machine) points, cash centres, bank branches and large retailers, which hold large amounts of cash or valuables, are attacked and robbed when particular circumstances allow. Such circumstances may be building works adjacent to an ATM secure room providing a temporary opportunity for criminals to break into the strong room through a tunnel or temporarily exposed wall. Likewise, nearby building works may provide criminals with access to heavy lifting tools that can be used to 'ram-raid' and remove a complete ATM from a site. Such examples of an ATM attack are fairly typical and can frequently provide the criminal with a haul in excess of £100,000.

Individually, these losses may not be enough to warrant taking conventional steps to counter them, as the costs of doing so are simply prohibitive. Taking into account that an ATM estate typically runs between 1,000 and 5,000 ATM sites, cumulative losses to only ten such attacks may easily reach levels in the region of £1,000,000 every year.

In order to improve, for example, ATM security, CCTV (Closed-Circuit Television) cameras may be used to monitor a defined area. The CCTV camera may be able to pan, tilt and zoom, but often numerous cameras are required to cover even relatively small workplaces. Also, as shown for example in FIG. 1, currently deployed CCTV systems 10 are completely inert, i.e. the role of the CCTV camera 12 is simply to provide video data 14, for example, to a Central Management Suit (CMS) 16 for recording the video data 14 and/or image analysis, and from which an operator may monitor a particular area and potentially witness a crime in progress.

However, during a crime in progress, there is not much the operator can do to address the crime, other than recording the visual/audible evidence and alarming appropriate authorities. Typically, such potential visual/audible evidence is easily defeated by the criminals by wearing coveralls and/or facemasks.

In addition, work groups, such as security guards, Cash-in-Transit (CIT) crews and police, are frequently moving in and out of the CCTV's field of vision and these work groups are therefore vulnerable to attack and duress when delivering or collecting valuables (e.g. banknotes, coins or items of value) to a supposedly secure site (e.g. cash centres, bank branches, ATM points, large retailers etc.).

In particular during a CIT operation, the currently utilised CCTV methodology does little or nothing to help preventing the crime and/or minimising the risk to the CIT operator(s). Some of the commonly known threats and risks during CIT operations may be minimised by utilising electronic aids, such as keys, code pouches, phones, beacons, tracking devices and panic alarms.

In addition, portable CCTV systems may be deployed where high value items are being openly transported, but on their own they are more costly to deploy than static CCTV's and offer no significant reduction of the security overhead. Typically, such systems have been developed to prove compliance of the wearer and not non-compliance of an aggressor. Portable CCTV systems would have to be 'bolted on' and used in conjunction with existing defences. However, the resulting cost would greatly increase the overhead without managing the potential threat any more effectively, therefore, achieving the exact opposite of what is required.

In addition, CIT operations typically follow a complex procedure that requires detailed planning, precise execution and particular equipment, in order to manage the potential risk of attempted robbery. Also, the CIT crew member has to follow a predefined route after picking up all of the keys and codes that may allow access to all of the sites predetermined for a visit during the course of the day. Some codes and keys may be taken to the site, while other keys may be stored on, or at least near the site to reduce the risk of duress.

However, this procedure makes any deviation from the pre-planned route during the CIT operation all but impossible. Furthermore, such a rigid approach increases the number of people that may potentially be at risk during a robbery or duress attack, because it involves the key holders and their co-workers (e.g. drivers, security guards etc.). A potentially dangerous situation may further be compounded by the lack of suitable training given to the CIT crew. Consequently, the CIT operation is 'weighed down' by an unreasonable amount of security systems that have to be carried and/or operated by the CIT crew (e.g. security guard) eventually leaving no room for the payload to be transferred. A typical set-up of a CIT drop-off is shown in FIG. 2, where an operator 20 drives on a pre-planned route to a predetermined destination site 22 (as close as physically possible), leaves the vehicle 24 and moves the valuable 26 from the vehicle 24 to the destination site 22.

Accordingly, it is an object of the present invention to provide a flexible security system and method adapted to minimise the risk of the loss of valuable from theft or robbery, and capable to instantly adapt to any unforeseen (i.e. unscheduled) incidents, changes or modifications.

SUMMARY OF THE INVENTION

Preferred embodiment(s) of the invention seek to overcome one or more of the above disadvantages of the prior art.

According to a first embodiment of the invention there is provided an adaptive access-control and monitor system, comprising:
- at least one portable communication device comprising, a transceiver, adapted to receive and transmit communication signals via a telecommunication link, at least one imaging sensor, adapted to provide image data to an image processor, a rechargeable energy source and a user interface;
- at least one first remote actuator, actuatable by said communication signals and/or electromagnetic energy;
- at least one control station, manned by at least one operator, adapted to receive and process said image data and monitor and/or control said at least one first remote actuator and said at least one portable communication device via said telecommunication link.

This provides the advantage of a reliable and secure, but also adaptively multifunctional monitoring and control system that is portable, but also allows for unlimited external support (e.g. via the CMS). In particular, when used, for example, with CIT operations, the present invention provides the advantage of a portable monitoring system that is operably linkable to a remote control station (e.g. CMS via telecommunication network or Internet), so as to allow, for example, real-time surveillance (e.g. video, audio, measurements of physical parameters) from a remote control station. In addition, the link also provides for full control of predetermined actuators from the remote control station, an onsite operator, or via predefined automatic trigger events. Furthermore, the system of the present invention provides the advantage that it can be utilised to guide an onsite operator through a predetermined procedure, therefore minimising potential human errors.

Advantageously, the at least one portable communication device may further comprise a transformer, adapted to receive and transmit said electromagnetic energy. This provides the advantage that a remote actuator can be actuated without the need for an internal energy source, i.e. the energy is transferred from the portable communication device when coupled with the actuator, thus, providing another level of protection for any unauthorised manipulation.

Preferably, the rechargeable energy source may be operably coupled to said transformer. Even more preferably, the rechargeable energy source may be adapted to selectively store energy received from said transformer and provide energy to said transformer. Even more preferably, the transformer may be adapted to effect mutual inductive coupling with at least one proximate conductor. This provides the advantage that the transformer can be utilised not only to provide energy to external actuators from an internal energy source (battery), but also to recharge the internal battery when connected to an external power source.

Advantageously, said at least one portable communication device may be adapted to provide a real-time video link from said imaging sensor to said at least one control station utilising said transceiver. Preferably, said real-time video link may include audio signals.

Advantageously, said portable communication device and/or said at least one first remote actuator may further comprise at least one sensor adapted to detect changes of at least one predetermined parameter. This provides the advantage that additional physical parameter can be measured and monitored allowing appropriate actions in the event of any predefined changes.

Advantageously, said video link may be selectively activatable from said at least one control station and in response to a predefined trigger event.

Advantageously, the adaptive access-control and monitor system may further comprise at least one second remote actuator actuatable by said communication signals and/or said electromagnetic energy.

Advantageously, the at least one second remote actuator may be actuatable by said predefined trigger event. Preferably, the predefined trigger event may be any one of a predetermined location, a predetermined time and a predetermined actuation signal. Even more preferably, the predetermined actuation signal may be provided by any one of said at least one sensor in response to a predetermined change of said at least one predetermined parameter, said at least one control station via said telecommunication link and said portable communication device. This provides the advantage of automated actions triggered by external signals ensuring that a required action is effected independent of the onsite operator.

Advantageously, the telecommunication link may be established via any one of a mobile network, the Internet, a long-range radio signal or a satellite communication system. This provides the advantage that the telecommunication link can be established independent of the distance to, for example, the remote control station. Preferably, the user interface may be any one of a touch screen, a voice recognition system and a keypad operably connectable to said portable communication device. Even more preferably, the at least one first remote actuator may be a locking mechanism. Even more preferably, the at least one second remote actuator may be a spoiling system, adapted to render a predetermined content unusable.

Advantageously, the second remote actuator may be tetherable to said portable communication device utilising a wireless connection, so as to allow data exchange between said portable communication device and said second remote actuator. Preferably, the wireless connection may be a Bluetooth® connection. This provides the advantage of a short-distance, which in itself could be used as a trigger signal (e.g. increasing the distance between the portable communication device and second remote actuator to a predetermined length).

Advantageously, the portable communication device may be a smart phone. Being able to utilise easily available communication devices that may be retrofitted with a required software application and/or external sensors significantly reduces associate costs and improves replaceability of damaged or lost (e.g. stolen) devices.

According to a second aspect of the invention there is provided an adaptive access-control and monitoring method, comprising the steps of:
monitoring and controlling at least one portable communication device from at least one remote control station, manned by at least one operator;
selectively monitoring and controlling at least one first remote actuator via a direct telecommunication link between said at least one control station and said at least one first remote actuator, or via an indirect telecommunication link between said at least one control station and said portable communication device operably coupled to said at least one first remote actuator;
monitoring and controlling said at least one first remote actuator via a wireless coupling between said portable communication device and said at least one first remote actuator.

Advantageously, the method may further comprise the steps of:
monitoring and controlling at least one second remote actuator via said direct telecommunication link between said at least one control station and said at least one second remote actuator, or via an indirect telecommunication link between said at least one control station and said portable communication device operably coupled to said at least one second remote actuator, and
monitoring and controlling at least one second remote actuator via said wireless coupling between said portable communication device and said at least one first remote actuator.

Even more advantageously, the method may further comprise the step of:
providing temporarily restricted or spatially restricted access codes to said portable communication device and/or said at least one first remote actuator via said telecommunication link.

Even more advantageously, the method may further comprise the step of:
providing an action controlled feedback from said at least one first remote actuator to said at least one control station and/or said portable communication device.

Even more advantageously, the method may further comprise the step of:
providing an action controlled feedback from said at least one second remote actuator to said at least one control station and/or said portable communication device.

Even more advantageously, the method may further comprise the step of:
providing a predetermined workflow to said portable communication device and monitoring compliance with said predetermined workflow.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to ATM security and Cash-in-Transit operations. However, it should be appreciated that, in general, the system and method of this invention will work equally well for any other procedure requiring surveillance, monitoring and/or adaptive control of remote actuators and/or remote guidance.

For purposes of explanation, it should be appreciated that the terms 'determine', 'calculate' and 'compute' and variations thereof, as used herein, are used interchangeably and include any type of methodology, process, mathematical operation or technique. In addition, the terms 'mobile', 'hand-held', 'smartphone', 'communication device' and variations thereof, as used herein, are used interchangeably and include any type of communication device. The terms 'top', 'bottom', 'front' and 'back' refer to a position during use, i.e. a portable communication device is attached to the front of an operator (i.e. to the chest area) allowing video monitoring of the area in from of the operator. The 'Internet' is under stood in its normal meaning, i.e. a global system of interconnected computer networks linked by a broad array of electronic, wireless, and/or optical networking technologies. The 'communication' network is understood to include any type of communication, such as, a mobile network, landline network (i.e. wire and optical) and satellite communication.

Figure 1:
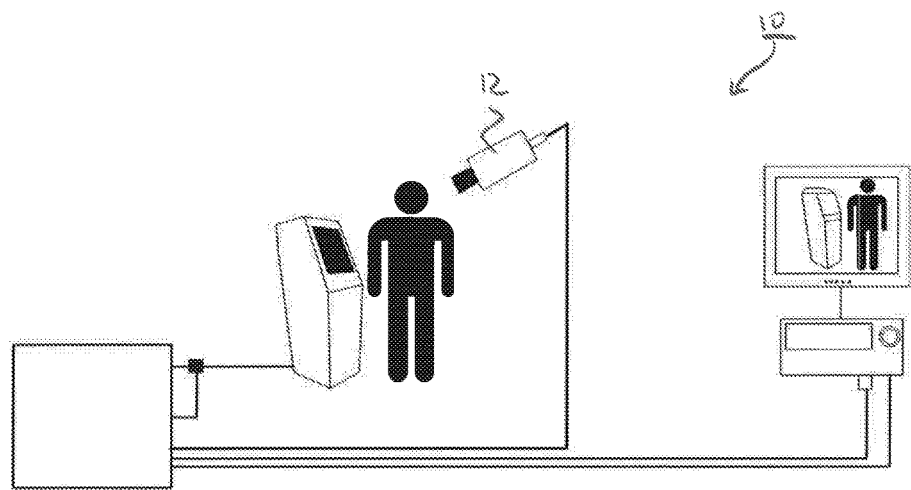
FIG. 1 (prior art) shows a schematic view of a commonly used security set-up at a cash machine (e.g. ATM) or a bank, where a CCTV monitors a restricted area of the site and where the video data is simply recorded for later use (if required)
Figure 2:
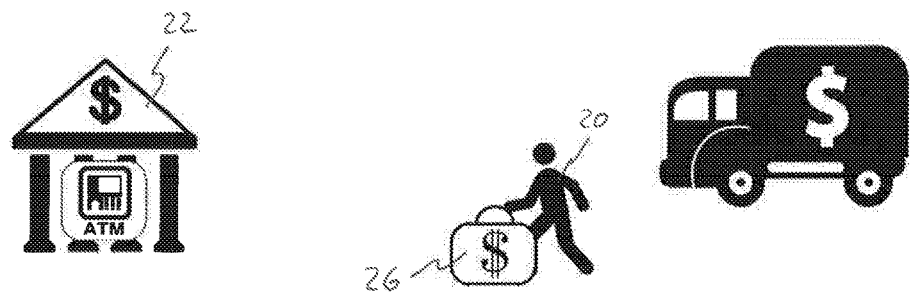
FIG. 2 (prior art) shows a schematic view of a typical Cash-In-Transit (CIT) operation, where the CIT operator simply moves the valuables from the CIT vehicle to a site (e.g. ATM) by foot.
Figure 3:
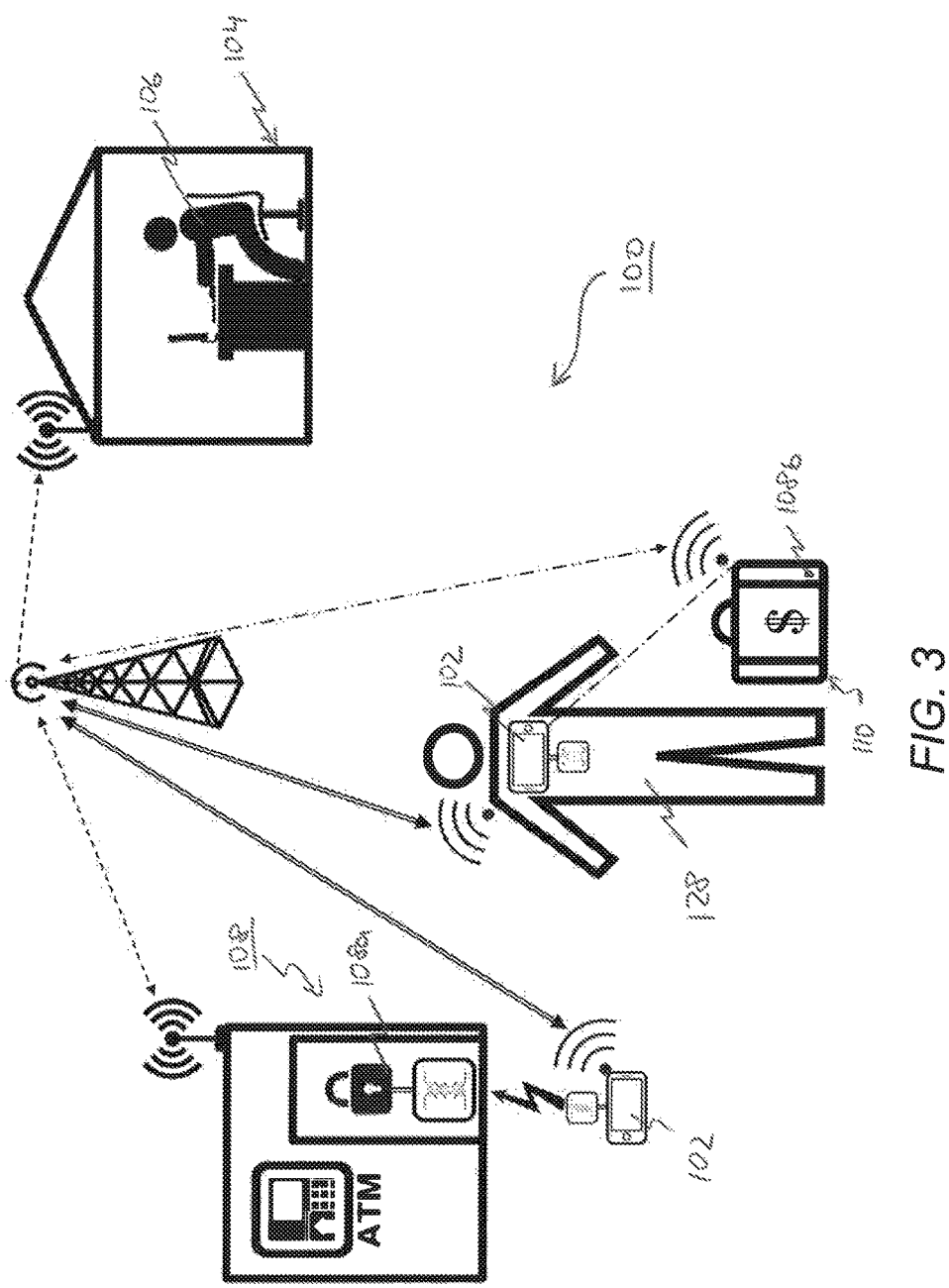
FIG. 3 illustrates a simplified schematic of the system of the present invention, showing communication links between, for example, the CIT operator, the transported valuable, the control station and the destination (e.g. ATM, bank), as well as, a wireless power link between the portable communication device and a lock (e.g. inductive coupling)

Referring now to FIG. 3, an example of an adaptive access-control and monitor system 100 is shown when used for a Cash-In-Transport operation. The system 100 comprises, inter alia, a portable communication device 102 (e.g. modified smartphone), a manned control station 104 (e.g. Central Management Suite) having at least one operator 106, and one or more remotely actuatable actuators 108, such as, for example, a locking mechanism 108a to an ATM pod, or a trigger mechanism 108b for a devaluation system of valuables (e.g. cash) stored in a carrier 110. The actuators 108 and portable communication device 102 are adapted to establish a long-range communication link with the control station and between each other (i.e. between portable communication device 102 and actuators 108) adaptively utilising any available communication network. For example, the portable communication device 102 and actuators 108 may communicate with the control station 104 via any one of a mobile network (e.g. 3G), the Internet (e.g. WIFI) or a satellite communication network. The actuators 108 may also establish a communication link via a landline communication network (e.g. wires, optical cables). In addition, the portable communication device 102 may be tetherable to an actuator 108 (e.g. the devaluation system 108b located in the carrier 110) via a wireless data link, such as Bluetooth, an unintentional disconnection of the tether may used to trigger a defensive action (e.g. actuate the devaluation system 108b).

Figure 4:
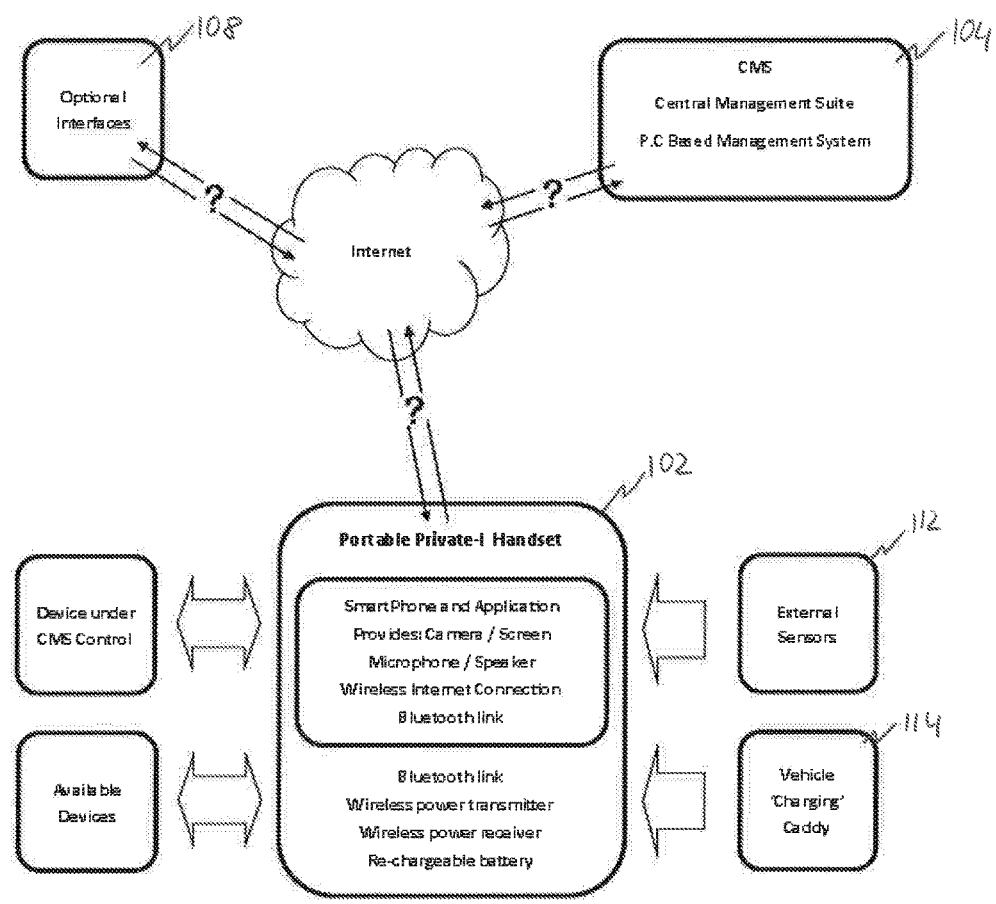
FIG. 4 shows a functional diagram of the system of the present invention, including communication pathways between the portable communication device (e.g. Smart Phone), the Control Station (CMS) and the external actuator (e.g. locks, devaluation system)

As shown in the schematic example of FIG. 4, the control station 104 can establish a bi-directional communication link with the portable communication device 102 and the actuators 108 via the Internet (e.g. WIFI, 3G). Alternatively, the portable communication device 102 may be connected to the control station 104 via a wired connection, for example, to upload data to or download data from the portable communication device 102. The portable communication device 102 may also be adapted to establish a one-way communication link to external sensors 112 (i.e. to receive sensor data), or a base station 114 (e.g. a charging station in a vehicle). Bi-directional communication links may be established between the portable communication device 102 and actuators 108 that may already be under the control of the control station 104. The portable communication device 102 is further adapted to communicate with other portable communication device(s) 102, e.g. to exchange relevant location data, status reports or relay signals from one portable communication device 102 to the control station 104.

Figure 5:
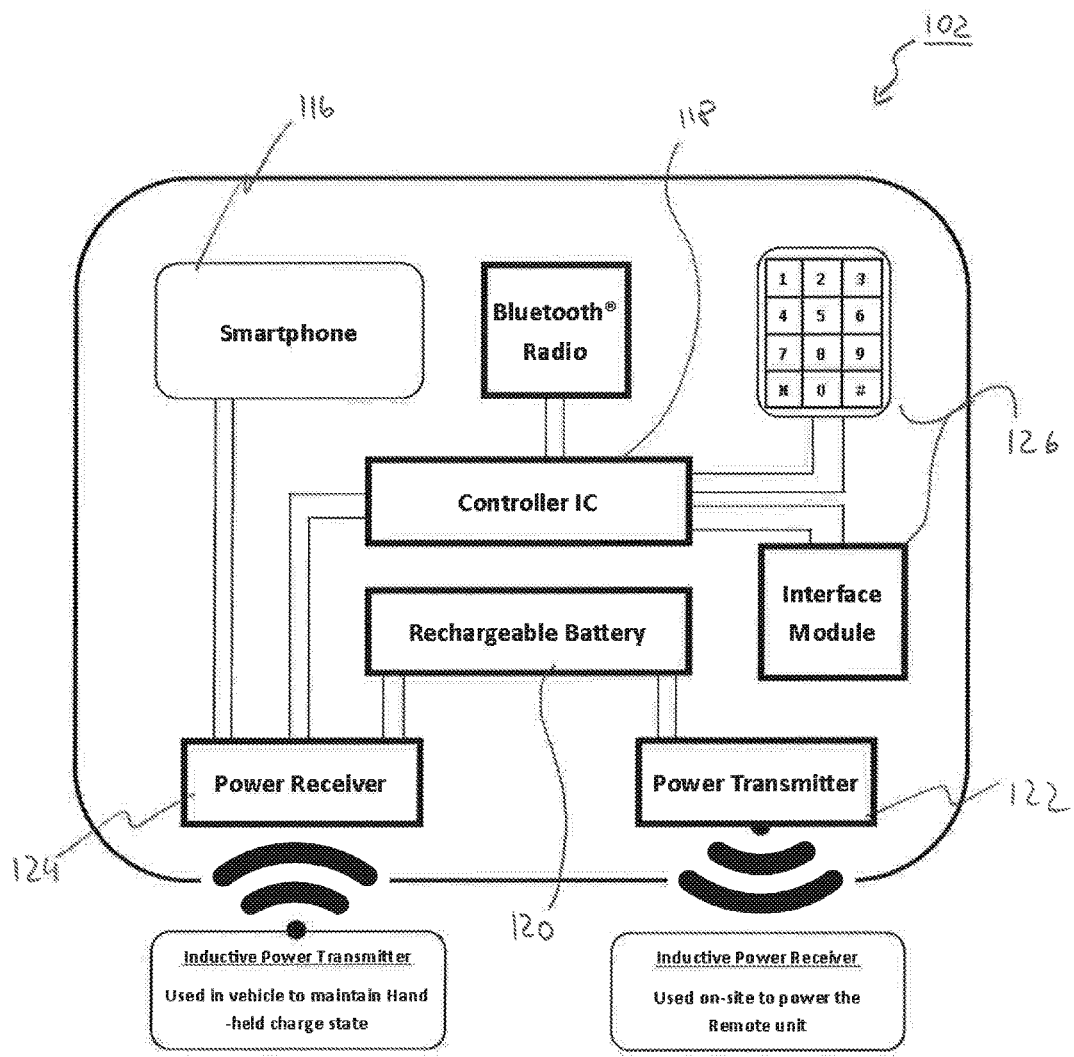
FIG. 5 shows a schematic diagram of a portable communication device, based on a modified smartphone.

FIG. 5 illustrates a simplified example schematic of a portable communication device 102 as, for example, used in CIT operations. In this particular example, the portable communication device is based around a commonly available smartphone 116 that can be re-charged in the CIT vehicle and which is capable of wirelessly transferring power to an actuator 108 (e.g. locking mechanism 108a). Preferably, the portable communication device 102 comprises a dedicated controller 118, adapted to control any inputs and outputs of the portable communication device 102, a rechargeable battery 120, adapted to provide energy to a transmitter 122, as well as, receive energy from a receiver 124. The embodiment of the transmitter 122 and receiver 124 may be in the form of an inductive transformer (not shown) that is adapted to provide inductive coupling with an external conductor (not shown). The portable communication device 102 further comprises a transceiver, adapted to transmit and receive communication signals via a communication network, a camera (not shown) adapted to provide image data (e.g. video) and/or audio data (e.g. embedded microphone), as well as, data storage means (not shown), adapted to store data provided by the camera/ microphone and/or any other data received from, for example, the control station 104, external sensors, or actuators 108 via any one of the available communication links. The user interface 126 of the portable communication device may include any one or all of a touch screen, voice recognition system and/or a selectively connectable keypad.

Example of Cash-In-Transit Operation

The adaptive access-control and monitor system 100 and its method of use will now be described in more detail in an example Cash-In-Transit operation with reference to FIGS. 3 to 7.

As mentioned earlier, CIT crews or operators 102 carry cash boxes contained within a separate carrying case 110 that may be equipped with specialist counter-measure systems, e.g. devaluation system 108b. These boxes are typically (though not always) self-contained in that they provide a devaluation agent (glue or ink), which is detonated so as to soak into the cash within the box. The cash boxes also incorporate the sensing- and logic circuitry required to actuate the devaluation system 108b to 'fire' the devaluing agent (e.g. glue, ink, dye), and also a tracking system (e.g. GPS device) adapted to provide a tracking signal when the box is taken from the scene unopened and moved to a different location by the criminal to open the box in a more controlled environment.

When using the adaptive access-control and monitor system 100 of the present invention, a constant video link is provided from the portable communication device 102 to the control station 104 (e.g. CMS) via the embedded video camera (not shown) positioned so as to show a front region of the operator 128 when securely attached to the operator 128. The video data provided to the control station 104 may be highlighted (e.g. visual marker, audible marker) during potentially high-risk situations, e.g. when the payload is moved by an operator 128 out of the vehicle and across the pavement. The visual or audible indicator of the incoming video stream is given more importance at the control station 104 making the control station operative 106 aware of the current status of the cash. The system 100 is also in constant communication with the devaluation system 108b located within the cash box, so that the control station operative 106 is able to actuate the devaluation system 108b at any time and without the need for any pre-defined stimulus. The portable communication device 102 may also maintain a 'Tether' based link to the cash box, so that in the event that the portable communication device 102 and the carrier 110 become separated, the devaluation system 108b located within the cash box will actuate automatically. The imminent actuation of the devaluation device 108b may be preceded by a warning signal sent to the control station 104, allowing the control station operative 106 to de-activate the devaluation system 108b manually in the event that there is an obvious malfunction.

The system 100, therefore, provides a much improved adaptability to unpredictable situations so that even if an attack is taking place, the system 100 can instantly action counter measures utilizing the overseeing control station operative 106 and automatically controlled communication links and actuation signals from the actuators 108 and portable communication device 102.

During use in a CIT operation, the crew member or CIT operator 128 has the portable communication device 102 removably mounted to the body so that the camera (e.g. smartphone camera or a connected external camera) is directed to the front of the operator 128 providing a constant 'live' video stream of the operator's 128 field of vision to the control station 104. When the operator 128 reaches the security door of, for example an ATM unit, the portable communication device 102 is removed from the body mount and placed in a door mount (e.g. a simple cradle attached to the door). In the preferred embodiment, the portable communication device 102 then establishes a wireless link ("docks") with the ATM door lock actuation mechanism 108a providing, for example, energy to the door lock mechanism 108a to actuate the door lock and open the ATM door. The power may be transferred by inductive coupling where the transformer of the portable communication device 102 induces a voltage in a conductive coil that is connected to the door lock mechanism 108a. Preferably, the conductive coil will be hidden within the door so that the door will not show any visible lock, actuator or interface other than the door mount for the portable communication device 102, and even the door mount may not be required as the operator may simply places the portable communication device 102 in close proximity of the conductive coil that is providing to the door lock mechanism 108a with power. Essentially the door can be a flat metal sheet with no obvious point to attack, therefore, providing significant benefits during an attack. For example, an attack will take considerably longer to succeed, the attack is also far more likely to fail completely, but most importantly it frequently results in a deflection of the crime to a site where a more conventional type of lock is deployed.

Alternatively, the portable communication device 102 may be connected to the door lock mechanism 108a via wired link allowing energy to be transferred form the portable communication device 102 power source (e.g. battery) to be fed into the door lock mechanism 108a. In another alternative embodiment, the door lock mechanism 108a has its own dedicated power source and the portable communication device 102 simply provides a trigger signal to the dedicated power source to actuate the door lock mechanism (i.e. open the door).

The portable communication device 102 may be used as a keypad for entering a security code. The keypad can be displayed on the touchscreen of the portable communication device 102, or it may be an external keypad that is coupleable (wired or wireless) to the portable communication device 102. CIT crews and operators 128 often wear protective gloves, or may have to operate in the rain and snow, in which case a touch screen interface may not be as practical as an external keypad.

Once the portable communication device 102 is docked with the ATM door, the operative may enter a unique ID code (e.g. identifying the operator or location etc.) that is encrypted and relayed to the control station 104, for example, via a G3 mobile network or WiFi or any other suitable communication link to the control station 104. The control station 104 may then send a separate encrypted unlock code to the portable communication device 102, which in turn will pass on the unlock code to the ATM door lock mechanism 108a thereby unlocking the security door either automatically or with varying degrees of user intervention. The unlock code may be provided under a separate layer of encryption that is un-known to the portable communication device 102, minimizing or preventing the risk of disclosing any critical information if the portable communication device 102 is stolen or lost. Also, using access codes removes the risk associated with carrying keys while removing the lock cylinder (conventionally a significant point of attack) altogether from the door.

During a prescheduled visit, i.e. the CIT operator 128 is at the destination site at the predetermined time, docking a predetermined portable communication device 102 with the door lock mechanism 108a and entering the correct user ID (and no 'panic signal' has been entered), the door access procedure may be controlled automatically (without any interference from the control station operator 106). However, if any of the predefined parameters go beyond the predetermined tolerance limits, progressive regulations may be applied during the operation, with each of the deviating parameters requiring an increasing level of user intervention.

The control station operator 106 may abort the process at any time, even if all conditions appear legitimate simply because the live video feed (or audio feed) of the camera leads the control station operator 106 to believe that the risk level is too high. The control station operator may trigger a range of counter-measures, for example, if the CIT operator 128 is under a duress attack where the CIT operator 128 is forced to enter valid data. In that scenario, the control station operator 106 may allow access to the room while devaluing the valuable that are taken away by the criminals.

After the payload is dropped off, the safe may be locked ('rapidly' in the event of an attack) by simply closing the safe door and turning the locking handle. The portable communication device 102 may relay all useful status information to the control station 104 logging the locking procedure and departure. Traditionally at this point, time delays would come into action to prevent a 'duress' attacker from forcing a crew member to unlock a recently locked safe. The system 100 of the present invention, however, eliminates the requirement for this as a subsequent attempt to re-open a safe may be predefined so as to require video supported approval from the control station 104. Only if the control station operator 106 deems it to be safe can the safe be re-opened (requiring another code entry at the site and from the control station 104 both of which would also be logged), allowing, for example, the secure and rapid clearing of note jams following a replenishment, which traditionally, would have to be dealt with by a separate crew and after a predetermined time period.

In addition, the system 100 of the present invention ensures that a predefined procedure is followed by the operator 128 when opening and closing the ATM door. For example, warning signals may be sent to the control station 104, if the safe door is not locked correctly or left open for follow-up attackers to gain rapid entry. The warning signals may be triggered by physical sensors installed to the door and can be confirmed by images provided by a camera.

Once the door is locked, the portable communication device 102 is removed from the door mount (e.g. cradle) and remounted at the CIT operator's body. The crew member(s) or CIT operator(s) 128 can now return to the CIT vehicle knowing that a full time-stamped audit of their visit has been recorded (and possibly shared with the client) so that everyone can share in the audit trail for their respective commercial viewpoints.

Examples of Mode of Operation of the Portable Communication Device

The portable communication device 102 may trigger automatic functions depending on its location. For example, when the portable communication device 102 is placed back into the vehicle docking station to receive a steady charge from the vehicle docking station, the docking station may transmit any data recorded by the portable communication device 102 via the inductively coupled charging circuit, i.e. by modulating the charging sine wave with a derivative of the well-known 'Manchester' encoding technique. As this maintains the Mark space ratio over a given time, it allows charging to continue uninterrupted while passing periodic status or location data between the portable communication device 102 and the control station 104.

Also, removing the portable communication device 102 from the vehicle docking station may indicate to the portable communication device 102 that it is entering a different mode of operation, in the case of a CIT delivery this may be defined as the 'Pavement mode' (i.e. the courier is crossing the pavement with a box of cash).

Any data recorded by the portable communication device 102 is stored with portable communication device 102, but also at the control station 104, where the data can be audited.

The portable communication device 102 can be used to establish a "tether" link (e.g. via Bluetooth) with the carrier 110 and devaluation device 108b, so that, when the "tether" is broken (e.g. a criminal removes the carrier after attacking the CIT operator 128), the devaluation device is actuated automatically.

Panic inputs can potentially be many and varied from dedicated proprietary panic response devices. The portable communication device 102 may comprise a number of panic input signals. For example, a voice recognition system of the portable communication device 102 may continuously monitor for a "Secret phrase" which, if recognized by the voice recognition system, will trigger a panic alarm that is silently sent to the control station 104. This panic alarm may be presented to the control station operator 106 in such a way that the appropriate video and/or audio footage is instantly available to select and deploy the appropriate counter-measures.

Likewise, a panic alarm may be triggered if a CIT operator 128 enters his password in a specific way, e.g. including a predefined error.

Figure 6:
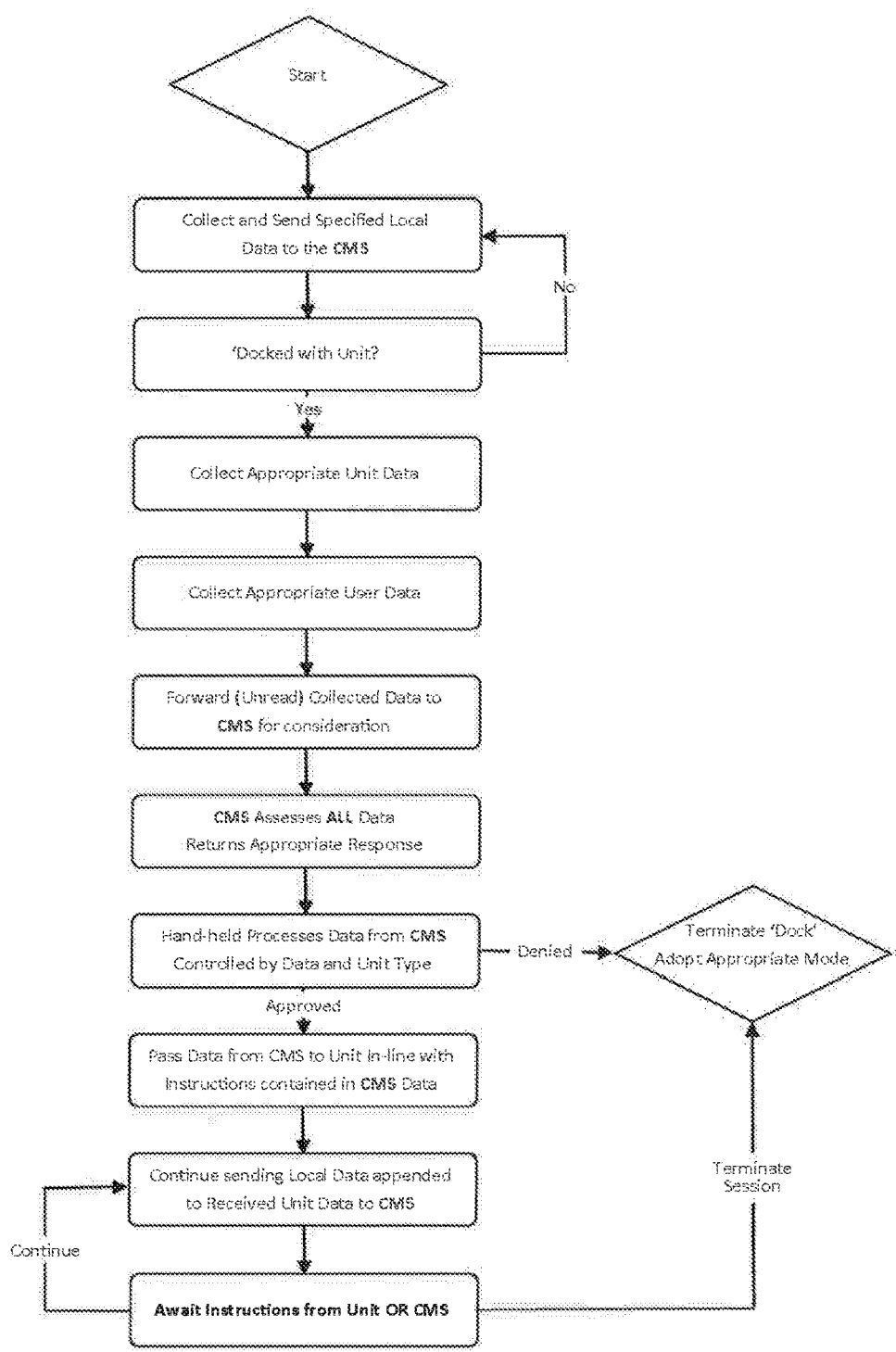
FIG. 6 shows a logic flow-chart of data transfer between the portable communication device (hand-held) and the Control Station (CMS) during a CIT session when docked with a vehicle docking station.
Figure 7:
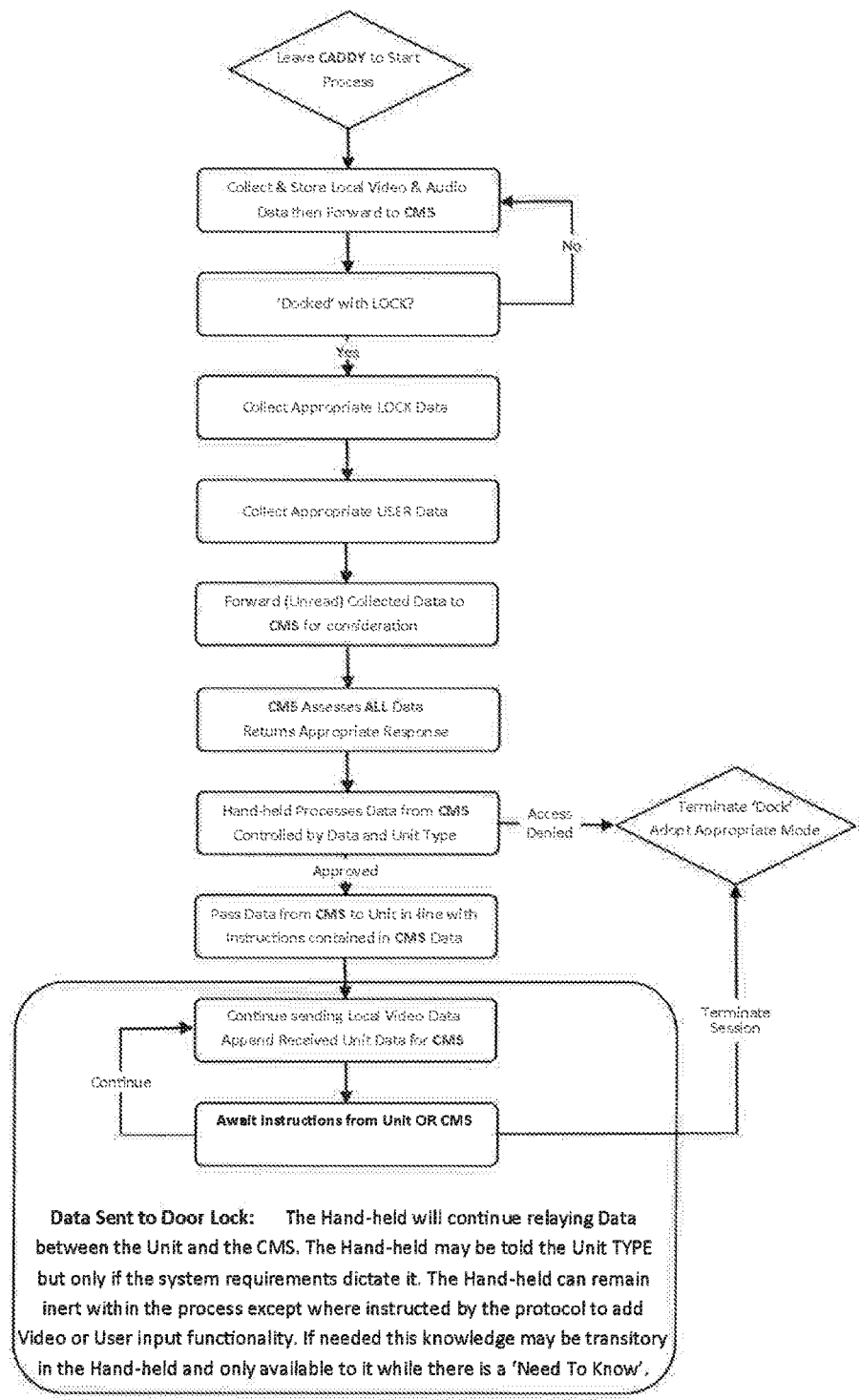
FIG. 7 shows an example workflow for a CIT operation in 'pavement mode' (i.e. when leaving the vehicle to drop off the payload) utilising the system of the present invention.

FIG. 6 shows a detailed example flow-chart of the core logic of the portable communication device 102 when docked with the vehicle's docking station an communicating with the control station 104. FIG. 7 shows a detailed flow-chart of the core logic of the portable communication device 102 when in the "Pavement mode" (i.e. when leaving the docking station) to drop a payload at a secured site.

It will be appreciated by persons skilled in the art that the above embodiment has been described by way of example only and not in any limitative sense, and that various alterations and modifications are possible without departing from the scope of the invention as defined by the appended claims.

For example, the system 100 of the present invention may be utilised for crowd control, where a person may be monitored and assessed during scanning of tickets, so as to prevent potential counterfeiting and "Touts". In addition, when crowds are formed, such as during football matches, the system 100 may be used to identify persons that have been banned in response to any offences committed previously. Furthermore, the system 100 may also be utilised protect any "static" by controlling and/or monitoring the access to the valuables. The system 100 can provide portable facial recognition that would not be achievable with conventional smartphones.

The invention claimed is:

1. An adaptive access-control and monitor system, comprising:

at least one portable communication device comprising, a transceiver, adapted to receive and transmit communication signals via a telecommunication link, at least one imaging sensor, adapted to provide image data to an image processor, a rechargeable energy source and a user interface;

at least one first remote actuator, actuatable via a wireless coupling between said portable communication device and said at least one first remote actuator; and at least one control station, manned by at least one operator;

wherein the at least one portable communication device is adapted to transmit to the at least one control station at least an identification code relayed from the portable communication device to the at least one control station and an image relayed from the portable communication device to the at least one control station, wherein the at least one control station is adapted to receive and process said image data and monitor and control said at least one first remote actuator via said telecommunication link by sending an actuation signal from said at least one control station to said portable communication device; and wherein the at least one portable communication device is further adapted to pass on the actuation signal from said portable communication device to said at least one first remote actuator via said wireless coupling between said portable communication device and said at least one first remote actuator.

2. An adaptive access-control and monitor system according to claim 1, wherein said at least one portable communication device further comprises a transformer, adapted to receive and transmit electromagnetic energy.

3. An adaptive access-control and monitor system according to claim 2, wherein said rechargeable energy source is operably coupled to said transformer.

4. An adaptive access-control and monitor system according to claim 1, wherein said at least one portable communication device is adapted to provide a real-time video link from said imaging sensor to said at least one control station utilizing said transceiver.

5. An adaptive access-control and monitor system according to claim 4, wherein said real-time video link includes audio signals.

6. An adaptive access-control and monitor system according to claim 1, wherein at least one of said portable communication device and said at least one first remote actuator further comprise at least one sensor adapted to detect changes of at least one predetermined parameter.

7. An adaptive access-control and monitor system according to claim 4, wherein said real-time video link is selectively activatable from said at least one control station and in response to a predefined trigger event.

8. An adaptive access-control and monitor system according to claim 1, further comprising at least one second remote actuator actuatable via a wireless coupling between said portable communication device and said at least one first remote actuator.

9. An adaptive access-control and monitor system according to claim 8, wherein said real-time video link is selectively activatable from said at least one control station and in response to a predefined trigger event, and wherein said at least one second remote actuator is actuatable by said predefined trigger event.

10. An adaptive access-control and monitor system according to claim 7, wherein said predefined trigger event is any one of a predetermined location, a predetermined time and a predetermined actuation signal.

11. An adaptive access-control and monitor system according to claim 10, wherein said predetermined actuation signal is provided by any one of said at least one sensor in response to a predetermined change of said at least one predetermined parameter, said at least one control station via said telecommunication link and said portable communication device.

12. An adaptive access-control and monitor system according to claim 2, wherein said rechargeable energy source is adapted to selectively store energy received from said transformer and provide energy to said transformer.

13. An adaptive access-control and monitor system according to claim 2, wherein said transformer is adapted to effect mutual inductive coupling with at least one proximate conductor.

14. An adaptive access-control and monitor system according to claim 1, wherein said telecommunication link is established via any one of a mobile network, the Internet, a long-range radio signal or a satellite communication system.

15. An adaptive access-control and monitor system according to claim 1, wherein said user interface is any one of a touch screen, a voice recognition system and a keypad operably connectable to said portable communication device.

16. An adaptive access-control and monitor system according to claim 1, wherein said at least one first remote actuator is a locking mechanism.

17. An adaptive access-control and monitor system according to claim 8, wherein said at least one second remote actuator is a spoiling system, adapted to render a predetermined content unusable.

18. An adaptive access-control and monitor system according to claim 8, wherein said at least one second remote actuator is tetherable to said portable communication device utilizing a wireless connection, so as to allow data exchange between said portable communication device and said at least one second remote actuator.

19. An adaptive access-control and monitor system according to claim 18, wherein said wireless connection is a Bluetooth® connection.

20. An adaptive access-control and monitor system according to claim 1, wherein said portable communication device is a smart phone.

21. An adaptive access-control and monitoring method, comprising the steps of:

monitoring and controlling at least one portable communication device comprising, a transceiver, adapted to receive and transmit communication signals via a telecommunication link, at least one imaging sensor, adapted to provide image data to an image processor, a rechargeable energy source and a user interface from a remote control station, manned by at least one operator by:

monitoring an identification code relayed from the portable communication device to the remote control station; and monitoring an image relayed from the portable communication device to the remote control station;

selectively monitoring and controlling at least one first remote actuator via an indirect telecommunication link between said at least one control station and said portable communication device operably coupled to said at least one first remote actuator by:

sending an actuation signal from said at least one control station to said portable communication device; and passing on the actuation signal from said portable communication device to said at least one first remote actuator via a wireless coupling between said portable communication device and said at least one first remote actuator.

22. An adaptive access-control and monitoring method according to claim 21, further comprising the steps of:

monitoring and controlling at least one second remote actuator via an indirect telecommunication link between said at least one control station and said portable communication device operably coupled to said at least one second remote actuator;

monitoring and controlling at least one second remote actuator via said wireless coupling between said portable communication device and said at least one first remote actuator.

23. An adaptive access-control and monitoring method according to claim 21, further comprising the step of:

providing temporarily restricted or spatially restricted access codes to said portable communication device and/or said at least one first remote actuator via said telecommunication link.

24. An adaptive access-control and monitoring method according to claim 21, further comprising the step of:

providing an action controlled feedback from said at least one first remote actuator to at least one of said at least one control station and said portable communication device.

25. An adaptive access-control and monitoring method according to claim 22, further comprising the step of:

providing an action controlled feedback from said at least one second remote actuator to at least one of said at least one control station and said portable communication device.

26. An adaptive access-control and monitoring method according to claim 21, further comprising the step of:

providing a predetermined workflow to said portable communication device and monitoring compliance with said predetermined workflow.

* * * * *